United States Patent [19]

Kassai

[11] 4,429,841
[45] Feb. 7, 1984

[54] EMERGENCY LOCKING DEVICE FOR SAFETY BELT RETRACTOR

[75] Inventor: Kenzou Kassai, Osaka, Japan
[73] Assignee: Kassai Kabushikikaisha, Osaka, Japan
[21] Appl. No.: 398,668
[22] Filed: Jul. 15, 1982

[30] Foreign Application Priority Data

Aug. 4, 1981 [JP] Japan .................................. 56-122694

[51] Int. Cl.³ .......................... A62B 35/02; B65H 75/48
[52] U.S. Cl. ........................................... 242/107.4 B
[58] Field of Search .................. 242/107.4 B, 107.4 A, 242/107.3; 280/806; 297/478, 480; 188/135, 139, 82.77

[56] References Cited

U.S. PATENT DOCUMENTS

| | | | |
|---|---|---|---|
| Re. 29,594 | 3/1978 | Takada | 242/107.4 B |
| 3,410,153 | 11/1968 | Merna | 242/107.4 B X |
| 3,552,676 | 1/1971 | Weber | 242/107.4 B X |
| 3,955,774 | 5/1976 | Weman | 242/107.4 B X |
| 4,177,962 | 12/1979 | Hildebrandt | 242/107.4 B |
| 4,310,129 | 1/1982 | Morinaga | 242/107.4 B |

*Primary Examiner*—John M. Jillions
*Attorney, Agent, or Firm*—W. G. Fasse; D. H. Kane, Jr.

[57] ABSTRACT

An emergency locking device equipped with a safety belt retractor wherein a reel (2) for winding a safety belt (1) thereon is rotatably mounted on a fixed reel support (4) with a shaft (3) fixed to the reel (2) being journaled on the support (4) and the reel (2) is biased to rotate in a belt rewinding direction by a return spring (5). In order to initiate the locking operation of the emergency locking device, there is provided a locking initiating inertia member (21) having its peripheral surface radially offset from the central axis of the shaft (3). The locking initiating inertia member (21) is rotatably mounted on the shaft (3). The movement of the locking initiating inertia member (21) is transmitted to a locking transmission pawl 19, the locking transmission pawl (19) is then engaged with one of inner ratchet teeth (14) of a drum-shaped clutching wheel (12) whereby the rotation of the shaft (3) is transmitted to the clutching wheel (12), the rotation of which makes a locking pawl 9 moved to be engaged with a ratchet wheel (8) fixed to the reel (2), so that the rotation of the shaft (3) is prohibited and, therefore, the withdrawal of the safety belt (1) is consequently prohibited.

5 Claims, 5 Drawing Figures

EMERGENCY LOCKING DEVICE FOR SAFETY BELT RETRACTOR

BACKGROUND OF THE INVENTION

1. Field of the Invention

This invention relates to emergency locking devices for safety belt retractors, and more particularly to those emergency locking devices for preventing the seat belts from being unwound in response to the sudden changes of the withdrawal forces arising in the seat belts wound by the safety belt retractors.

2. Description of the Prior Art

Emergency locking devices of the type disclosed herein have been advantageously used with seats equipped with safety belts in vehicles, aircraft or the like. More specifically, while under normal conditions free unwinding and rewinding of the seat belt with respect to a safety belt retractor are permitted in response to the change of the attitude of a seat occupant, in the event of an emergency, such as the case where the seat occupant is subjected to an unusual load, as during an accident the withdrawal of the safety belt is locked to prevent the seat occupant from jumping out of the seat, whereby both comfortableness under normal conditions and safety in an emergency are satisfied.

Various structures of such emergency locking devices for safety belt retractors have been proposed. Particularly, it is impossible to make these emergency locking devices larger because of restrictions in spaces where they are installed. Therefore, it is preferable that a device for emergency locking can be achieved only by adding a few parts to the inherent structure of a safety belt retractor. Further, the requirement for miniaturization also means trying to make the structure simpler. Moreover, it can be said that the simpler the structure is, the fewer breakdowns occur, and thus the higher the safety becomes. Besides, the simpler structure may simplify operations for assembling such an emergency locking device of a safety belt retractor.

SUMMARY OF THE INVENTION

Accordingly, it is a principal object of the present invention to provide an emergency locking device for a safety belt retractor having a simple structure which brings about various advantages described above.

Generally, the present invention contemplates forcing a locking operation to be initiated by taking advantage of the inertia of a locking initiating inertia member having its outer peripheral surface radially offset from its axis of rotation. In summary, the present invention comprises an emergency locking device, equipped with a safety belt retractor wherein a reel for winding a safety belt thereon is rotatably mounted on a fixed reel support with a shaft fixed to the reel being journaled on the support, and the reel is biased to rotate in a belt rewinding direction by a return spring, comprising: a ratchet wheel fixed to the reel; a locking pawl mounted on the reel support so as to be movable between engaging and disengaging positions with respect to the ratchet wheel; a releasing spring urging the locking pawl toward a disengaging position from the ratchet wheel; a drum-shaped clutching wheel rotatably mounted on the shaft, the clutching wheel being provided with inner ratchet teeth on its inner peripheral surface and engaging projections on its outer peripheral surface, said engaging projections being engaged with said locking pawl; a locking initiating inertia member rotatably mounted on said shaft, said locking initiating inertia member having its outer peripheral surface radially offset from the central axis of the shaft; a mounting plate fixedly positioned on said shaft; a locking transmission pawl pivotally mounted about an axis on said mounting plate, said locking transmission pawl keeping in contact with the outer peripheral surface of said locking initiating inertia member so as to be movable between engaging and disengaging positions with respect to one of said inner ratchet teeth according to the rotation of said locking initiating inertia member with respect to said shaft; a biasing spring urging said locking transmission pawl to be disengaged from said inner ratchet teeth; and a control member mounted on said mounting plate to limit the rotation of said locking initiating inertia member within a predetermined range.

According to the present invention, there is provided an emergency locking device for a safety belt retractor which can advantageously operate by taking advantage of the inertia of the locking initiating inertia member having its outer peripheral surface radially offset from its axis of rotation. Further, the structure of the device is rather simple and, therefore, this may contribute to enabling the emergency locking device to be compactly equipped with a safety belt retractor, and the device has advantages in terms of few breakdowns and simple operations for assembling it.

The above and other objects and features of the present invention will become more apparent from the following detailed description given with reference to the accompanying drawings.

DESCRIPTION OF THE PREFERRED EMBODIMENTS

Figure 1:
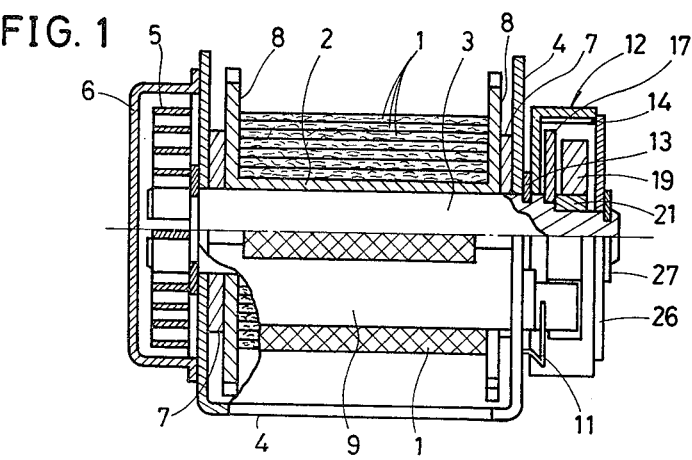
FIG. 1 is a front view showing an embodiment of the present invention, in section on the upper side thereof and partly in section on the lower side thereof, respectively.

A safety belt 1 is wound on a reel 2. A shaft 3 is fixedly attached to the reel 2. The shaft 3 is journaled for rotation on a reel support 4. The reel support 4 comprises means for fixing the safety belt retractor to a suitable fixed position (not shown). A return spring 5 is connected to the left-hand end, in FIG. 1, of the shaft 3, whereby the reel 2 is constantly biased to rotate in the direction to rewind the safety belt 1. The return spring 5 is covered by a cover 6. Further, between the opposite ends of the reel 2 and the support 4, spacers 7 are disposed so that the reel 2 can be rotated in a position. With the arrangement described so far, the safety belt retractor attains an operation in which the safety belt 1 can be unwound and rewound smoothly in response to the change of the attitude of a seat occupant.

The arrangement of the emergency locking device which operates in the event of an emergency described above will now be described.

A ratchet wheel 8 is provided fixedly to the reel 2, for example, in the specific embodiment shown, on a flange portion as an integral part of the reel 2. The ratchet wheel 8 is provided with ratchet teeth at its outer periphery. A locking pawl 9 is arranged in association with the ratchet wheel 8. The locking pawl 9 is supported by the reel support 4 at its opposite ends so as to be movable between engaging and disengaging positions with respect to the ratchet wheel 8. More specifically, the reel support 4 is provided with trapezoidal or fan-shaped mounting openings 10 for receiving the opposite ends of the locking pawl 9, which locking pawl 9 is movable within the range of the mounting openings 10, thereby to attain the conditions of engaging and disengaging with respect to the above described ratchet wheel 8. The locking pawl 9 is constantly urged toward a disengaging position from the ratchet wheel 8 by a releasing spring 11 connected between the locking pawl 9 and the reel support 4.

A drum-shaped clutching wheel 12 is rotatably mounted on the shaft 3. The clutching wheel 12 is positioned by a ring 13 in terms of the axial direction of the shaft 3. The inner peripheral surface of the clutching wheel 12 is provided with inner ratchet teeth 14. Further, the outer peripheral surface of the clutching wheel 12 is provided with engaging projections 16 which are engaged with the bent portion 15 of the locking pawl 9. The engaging projections 16 bring about a recess for receiving the bent portion 15 of the locking pawl 9.

A mounting plate 17 is fixedly positioned on the shaft 3. The mounting plate 17 is received within the inner space of the clutching wheel 12. A locking transmission pawl 19 is pivotally mounted about an axis 18 on the mounting plate 17. The locking transmission pawl 19 is permitted to be movable between engaging and disengaging positions with respect to one of the inner ratchet teeth 14 according to the rotation of the locking transmission pawl 19 about the axis 18. A biasing spring 20 is connected between the locking transmission pawl 19 and the mounting plate 17, whereby the locking transmission pawl 19 is constantly urged toward the direction of disengagement from the inner ratchet teeth 14. The biasing spring 20 is not limited to a coil spring as shown. A torsion spring arranged about the axis 18 may be used in place of such coil spring.

A locking initiating inertia member 21 is rotatably mounted on the shaft 3. The locking initiating inertia member 21 has its outer peripheral surface radially offset from the central axis of the shaft 3. The locking initiating inertia member 21 is preferably formed of metal having a relatively heavy weight. The locking initiating inertia member 21 is arranged to keep in contact with the locking transmission pawl 19 at its surface opposed to the shaft 3. For the purpose of limiting the rotation of the locking initiating inertia member 21 within a predetermined range, a control member 22 is mounted on the above described mounting plate 17.

On the basis of the foregoing arrangement, the function and operation of the safety belt retractor as shown will be described with reference to the emergency locking device.

Figure 2:
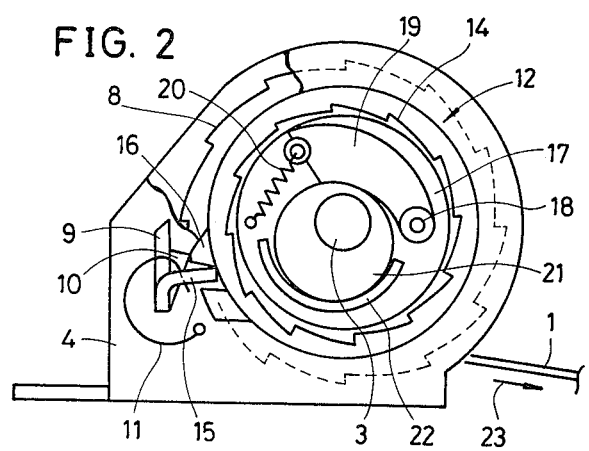
FIG. 2 is a right-hand side and partially cutaway view showing the safety belt retractor of FIG. 1.

First, under normal conditions, while the safety belt 1 may be unwound in the direction of arrow 23 with some resistance as a result of the effect of the return spring 5, the safety belt 1 may be rewound under the force of the return spring 5 acting on the reel 2 when such withdrawal force is removed. In other words, the safety belt 1 is in the condition to be unwound or rewound smoothly in response to the change of the seat occupant's attitude. In this state, as well shown particularly in FIG. 2, the locking transmission pawl 19 is kept to be disengaged from the inner ratchet teeth 14. Accordingly, in response to the unwinding or rewinding operation of the safety belt 1, the shaft 3 is rotated and thus the mounting plate 17 fixedly positioned on this is rotated. In response to this rotation, the rocking transmission pawl 19 is also moved in the direction of rotation within the clutching wheel 12, but in this normal condition, the locking transmission pawl 19 is never rotated in the direction to be engaged with the inner ratchet teeth 14 because the locking transmission pawl is kept to be urged by the biasing spring 20 so as to be disengaged from the inner ratchet teeth 14. In such state, the locking initiating inertia member 21 is rotated about the shaft 3 following the locking transmission pawl 19. Accordingly, the rotation of the shaft 3 is not transmitted to the clutching wheel 12 and, therefore, the clutching wheel 12 remains stopped and cannot operate the locking pawl 9. However the ratchet wheel 8 can be freely rotated, and consequently the withdrawal of the safety belt 1 in the direction of arrow 23 is not locked.

Figure 4:
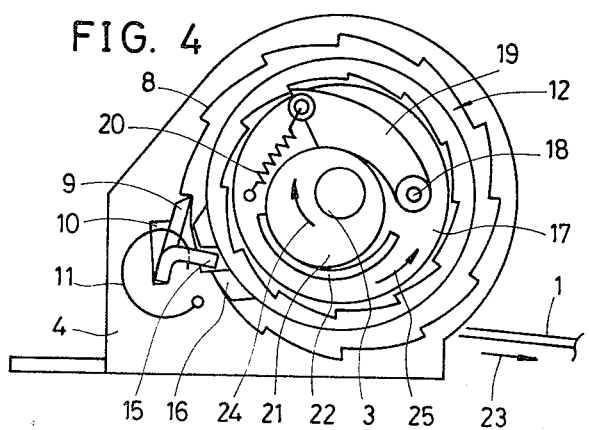
FIG. 4 a right-hand side view, schematically showing the constituent elements included in the emergency locking device portion of the safety belt retractor of FIG. 1, in an overlapping manner.

The operation in the event of an emergency will now be described. FIG. 4 is a right-hand side view schematically showing the constituent elements included in the emergency locking device for the safety belt retractor of FIG. 1 and showing the locking state thereof. Now, it will be assumed that the safety belt 1 is extracted with the sudden change of acceleration. In response to this, the mounting plate 17 is rotated with the shaft 3 in the same manner as described above. However, this rotation of the mounting plate 17 is accompanied by the sudden change of acceleration. Therefore, the locking initiating inertia member 21 cannot follow this sudden change of acceleration like in the normal situation described above. More specifically, the locking initiating inertia member 21 tends to remain at the present position by its inertia and, therefore, this effect results in the relative rotation of the locking initiating inertia member 21 in the direction of arrow 24 with respect to the shaft 3. In this sense, it is preferable that the locking initiating inertia member 21 is formed of metal having a relatively heavy weight. By this relative rotation of the locking initiating inertia member 21 in the direction of arrow 24, the locking transmission pawl 19 is rotated about the axis 18 in the direction to be engaged with the inner ratchet teeth 14 against the effect of the biasing spring 20. Therefore, the locking transmission pawl 19 is engaged with the nearest one of the inner ratchet teeth 14 during the rotation of the mounting plate 17 and thus the rotation of the shaft 3 in the direction of arrow 25. Then, when the shaft 3 is further rotated in the direction of arrow 25, the clutching wheel 12 is rotated in the direction of arrow 25 by the transmission through the mounting plate 17 and the locking transmission pawl 19. In response to this, one of the engaging projections 16 formed on the outer peripheral surface of the clutching wheel 12 makes the locking pawl 9 rotate within the mounting opening 9 in the clockwise direction in FIG. 4 against the resilience of the releasing spring 11. Consequently, the locking pawl 9 is moved in the direction to be engaged with the ratchet wheel 8 and may be engaged with the nearest ratchet tooth of the ratchet wheel 8. This state is shown in FIG. 4, wherein the ratchet wheel 8 is fixed to the reel support 4 through the locking pawl 9 and, therefore, the reel 2 is secured and the withdrawal of the safety belt 1 in the direction of arrow 23 is prohibited.

When the above described emergency condition is released, the safety belt 1 is rewound on the reel 2 by the effect of the return spring 5. Further, the locking initiating inertia member 21 has been already settled at one end of the controlling member 22 by the effects of the biasing spring 20 and the locking transmission pawl 19, and the locking transmission pawl 19 has been in the disengagement state from the inner ratchet teeth 14. Therefore, the locking pawl 9 will become in the disengagement state from the ratchet wheel 8 by the effect of the releasing spring 11 with the clutching wheel 12 being slightly rotated. Consequently, the device returns to its normal position.

Figure 3:
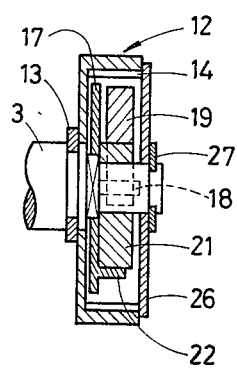
FIG. 3 is a front view, in section, showing a locking initiating portion of the safety belt retractor of FIG. 1.

In addition, as shown in FIGS. 1 and 3, the operating elements, such as the locking transmission pawl 19 and the locking initiating inertia member 21 and so on, are covered by a cover plate 26 which closes one end surface of the drum-shaped clutching wheel 12. The cover plate 26 is positioned on the shaft 3 by a ring 27. Another embodiment wherein the cover plate 26 is omitted and the mounting plate 17 supplies the place of the cover plate 26 may be considered. This will be described referring to FIG. 5.

Figure 5:
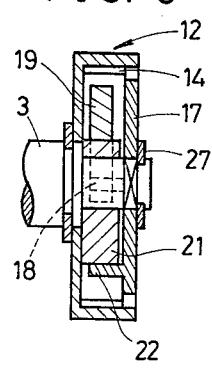
FIG. 5 is a front view, in section, showing another embodiment of the present invention, corresponding to FIG. 3.

FIG. 5 is a front view, in section, showing such another embodiment of the present invention and corresponding to FIG. 3. In FIG. 5, the same reference numerals are used for the portions corresponding to those in FIG. 3.

Referring to FIG. 5, the mounting plate 17 is adapted to cover the open end of the drum-shaped clutching wheel 12 and is fixed to the shaft 3 by the ring 27. The axis 18 and the control member 22 are mounted on the inner side of the mounting plate 17 in projected states. The relationship for positioning the locking transmission pawl 19, the locking initiating inertia member 21 and so on is preserved in substantially the same state as shown in FIG. 3. Therefore, the function and operation of those are just the same as those of FIG. 3 and, therefore, no explanation will be required.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An emergency locking device equipped with a safety belt retractor wherein a reel (2) for winding a safety belt (1) thereon is rotatably mounted on a fixed reel support (4) with a shaft (3) fixed to the reel (2) being journaled on the support (4), and the reel (2) is biased to rotate in a belt rewinding direction by a return spring (5), comprising:
    a ratchet wheel (8) fixed to the reel (2);
    a locking pawl (9) mounted on the reel support (4) so as to be movable between engaging and disengaging positions with respect to the ratchet wheel (8);
    a releasing spring (11) urging the locking pawl (9) toward a disengaging position from the ratchet wheel (8);
    a drum-shaped clutching wheel (12) rotatably mounted on the shaft (3), said clutching wheel (12) being provided with inner ratchet teeth (14) on its inner peripheral surface and engaging projections (16) on its outer peripheral surface, said engaging projections (16) being engaged with said locking pawl (9);
    a locking initiating inertia member (21) rotatably mounted on said shaft (3), said inertia member (21) having its outer peripheral surface radially offset from the central axis of the shaft (3);
    a mounting plate (17) fixedly positioned on said shaft (3);
    a locking transmission pawl (19) pivotally mounted about an axis (18) on said mounting plate (17), said locking transmission pawl (19) keeping in contact with the outer peripheral surface of said locking initiating inertia member (21) so as to be movable between engaging and disengaging positions with respect to one of said inner ratchet teeth according to the rotation of said locking initiating inertia member (21) with respect to said shaft (3);
    a biasing spring (20) urging said locking transmission pawl (19) to be disengaged from said inner ratchet teeth (14); and
    a control member (22) mounted on said mounting plate (17) to limit the rotation of said locking initiating inertia member (21) within a predetermined range.

2. The device in accordance with claim 1, wherein said reel (2) comprises a flange portion as an integral part thereof, and said flange portion acts as said ratchet wheel (8).

3. The device in accordance with claim 1, wherein said locking initiating inertia member (21), said mounting plate (17), said locking transmission pawl (19) and said control member (22) are received within a space surrounded by said drum-shaped clutching wheel (12).

4. The device in accordance with claim 2, wherein said drum-shaped clutching wheel (12) was an opening at one end surface thereof and which further comprises a cover plate (26) for closing said opening.

5. The device in accordance with claim 3, wherein said drum-shaped clutching wheel (12) has an opening at one end surface thereof, and said mounting plate (17) is positioned so as to close said opening.

* * * * *